United States Patent
Zhou et al.

(10) Patent No.: US 10,728,225 B1
(45) Date of Patent: *Jul. 28, 2020

(54) PEOPLE-BASED USER SYNCHRONIZATION WITHIN AN ONLINE SYSTEM

(71) Applicant: Facebook, Inc., Menlo Park, CA (US)

(72) Inventors: Li Zhou, Campbell, CA (US); William Bullock, Palo Alto, CA (US); Anh Phuong Bui, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,654

(22) Filed: Mar. 6, 2019

Related U.S. Application Data

(63) Continuation of application No. 15/415,684, filed on Jan. 25, 2017, now Pat. No. 10,270,746.

(51) Int. Cl.
*H04L 29/06* (2006.01)
*G06F 21/31* (2013.01)
*H04L 29/08* (2006.01)
*G06Q 30/06* (2012.01)

(52) U.S. Cl.
CPC .......... *H04L 63/0428* (2013.01); *G06F 21/31* (2013.01); *G06Q 30/0609* (2013.01); *G06Q 30/0635* (2013.01); *H04L 63/08* (2013.01); *H04L 63/12* (2013.01); *H04L 63/1408* (2013.01); *H04L 67/02* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 9,807,194 | B1 | 10/2017 | Beaty |
| 10,423,985 | B1 * | 9/2019 | Dutta ................. G06Q 30/0269 |
| 2012/0110071 | A1 | 5/2012 | Zhou et al. |
| 2014/0068736 | A1 | 3/2014 | Agerstam et al. |
| 2014/0229273 | A1 * | 8/2014 | Garcia-Martinez ......................... G06Q 30/0275 705/14.46 |
| 2014/0279045 | A1 * | 9/2014 | Shottan .............. G06Q 30/0269 705/14.66 |
| 2014/0358826 | A1 * | 12/2014 | Traupman .............. G06N 5/048 706/11 |
| 2015/0019547 | A1 | 1/2015 | Thalapathy et al. |
| 2015/0156192 | A1 | 6/2015 | Yang et al. |

(Continued)

*Primary Examiner* — Shin-Hon (Eric) Chen
(74) *Attorney, Agent, or Firm* — Fenwick & West LLP

(57) ABSTRACT

Embodiments include one or more client devices accessible by users, an online system, and one or more partner systems such that the online system is able to identify a user of the online system across different devices and browsers based on the user activity that occurs external to the online system. A user performs user actions (e.g. purchase a product) on a web page of a partner system and may provide personally identifiable information (PII) to the partner system. The partner system provides the hashed PII and user actions performed by the user to the online system. The online system identifies a user profile on the online system by matching personal information in the user profile to the hashed PII. The online system generates a confidence score indicating a likelihood that the identified user of the online system is the individual that performed the external user action.

20 Claims, 5 Drawing Sheets

(56) References Cited

U.S. PATENT DOCUMENTS

| | | | |
|---|---|---|---|
| 2015/0293997 A1* | 10/2015 | Smith | G06F 16/95 |
| | | | 707/749 |
| 2015/0371256 A1 | 12/2015 | Shah et al. | |
| 2016/0080793 A1 | 3/2016 | Ruffini et al. | |
| 2016/0259790 A1* | 9/2016 | Mashiach | G06F 16/9535 |
| 2017/0026703 A1* | 1/2017 | Phadnis | G06Q 30/02 |
| 2017/0103322 A1* | 4/2017 | Baluja | G06Q 50/01 |
| 2017/0142035 A1* | 5/2017 | Bradley | H04L 51/32 |
| 2018/0040003 A1* | 2/2018 | Scharf | G06Q 30/0201 |
| 2018/0046628 A1* | 2/2018 | Wang | G06Q 50/01 |
| 2018/0052913 A1 | 2/2018 | Gaskill et al. | |
| 2018/0097800 A1* | 4/2018 | Parikh | H04L 63/0815 |

* cited by examiner

PEOPLE-BASED USER SYNCHRONIZATION WITHIN AN ONLINE SYSTEM

CROSS REFERENCE TO RELATED APPLICATIONS

This application is a continuation of co-pending U.S. application Ser. No. 15/415,684, filed Jan. 25, 2017, which is incorporated by reference in its entirety.

BACKGROUND

This disclosure generally relates to online systems, and more specifically to synchronizing user activity on external systems to a user of an online system when the user is not logged into the online system.

Users often undertake actions on web pages that are external to an online system, such as a social networking system. Importantly, online systems are often able to identify users that perform actions external to the online system. For example, a user may have previously logged into the online system using a browser, which causes the online system to store a cookie on the browser containing an identifier of the user on the online system (e.g. an online system user ID). Therefore, at a subsequent time point, if a user performs an action on a web page of a partner system (e.g. external to the online system), the online system can access the stored cookie from the browser and identify the user of the online system that is associated with the online system user ID as the user that performed the user activity.

However, users today have many choices in client devices (e.g. mobile phones, tablets, computers, laptops, etc.) and browsers (Chrome™, Internet Explorer™, Firefox™, etc.) that can be used to access the Internet. Therefore, an increasing number of scenarios occur where a user performs a user action external to the online system without having previously logged into the online system. In other words, these users use a browser or a client device to perform actions external to the online system while being logged out of the online system. In this scenario, a cookie may not exist on the browser or the client device, thereby preventing the online system from identifying the user that performed the user action.

The inability of an online system to accurately identify user actions that occur external to the online system leads to several drawbacks. For example, the online system may maintain a social graph that describes associations between its users and entities of interest. Therefore, the online system cannot maintain an accurate and comprehensive understanding of the user's interests in the social graph if the online system is unable to identify user actions that occur external to the online system. Another drawback stemming from this inability is that online systems are unable to accurately track the actions of its users on an external web page that may be caused by the presentation of content items. Thus, online systems may significantly underestimate the performance of a presented content item.

SUMMARY

Embodiments of the invention provide a solution for matching a user who is not logged into an online system with the user's identity/profile on the online system across different devices and browsers via third party system or partner personal identification information (PII) for the user provided to the online system (e.g., via pixel fires). An example embodiment of the invention includes one or more client devices accessible by users, an online system, and one or more partner systems. The online system presents a content item (e.g., content provided by a partner system for display to a user on the online system) to a user on the client device and receives an indication that the user viewed and/or interacted with the content item. In many scenarios, a user may choose to perform an action related to the content item (e.g., visit a web page included in the content item) on a different device or browser with which the user has not previously logged into the online system. Therefore, if the user performs user actions external to the online system as a result of viewing the content item, the online system is unable to accurately characterize the behavior of the user as resulting from having viewed the content item.

The partner system receives information associated with the user such as identifiers that identify the client device or browser used by the user, a user login unique to the partner system (e.g. user's partner system ID), and/or personally identifiable information (PII) of the user. For example, a user may choose to proceed with an online purchase of a product from a partner system and therefore, provides his/her PII using a client device to complete the purchase. In one embodiment, the partner system hashes or other techniques that make confidential the PII belonging to the user for privacy purposes and stores the hashed PII information. The partner system sends to the online system the hashed PII information. For example, this might be sent by the user's browser to the online system via a pixel fire that occurs when the user's browser loads a confirmation of purchase page that includes a tracking pixel, or might be sent via a mobile application that uses an API for the online system or other mechanism. The online system can then match the viewing of the content item by the user on one device or browser while logged in with the potential product purchase or conversion on another device or browser while not logged in. Since the user is now known on the new browser or device, the online system can do conversion tracking for that user on that device/browser in other contexts (e.g., for other partner systems without the other partner systems having access to the PII from the first partner system).

The online system hashes personal information retrieved from user profiles of the online system and matches the hashed personal information of a user profile to the hashed PII from the partner system. For example, the hashed PII may correspond to a phone number that matches a phone number listed on a user profile on the online system. The online system may additionally associate a confidence score with the match, indicating a likelihood that the identified user of the online system is the individual that committed the user action external to the online system.

Having identified a user of the online system that performed the user action on a web page of the partner system, the online system can expand the social graph of the online system to reflect the association between the user of the online system and the partner system. Alternatively, the online system can update the performance of the content item to reflect the knowledge that the content item was successful in causing a purchase on the partner system. Additionally, the online system can create a cookie that identifies the user as having used the new browser or device. Therefore, if the user of the online system makes future purchases using the same browser or device on web pages of other partner systems, the online system can associate the user activity as belonging to the user of the online system.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
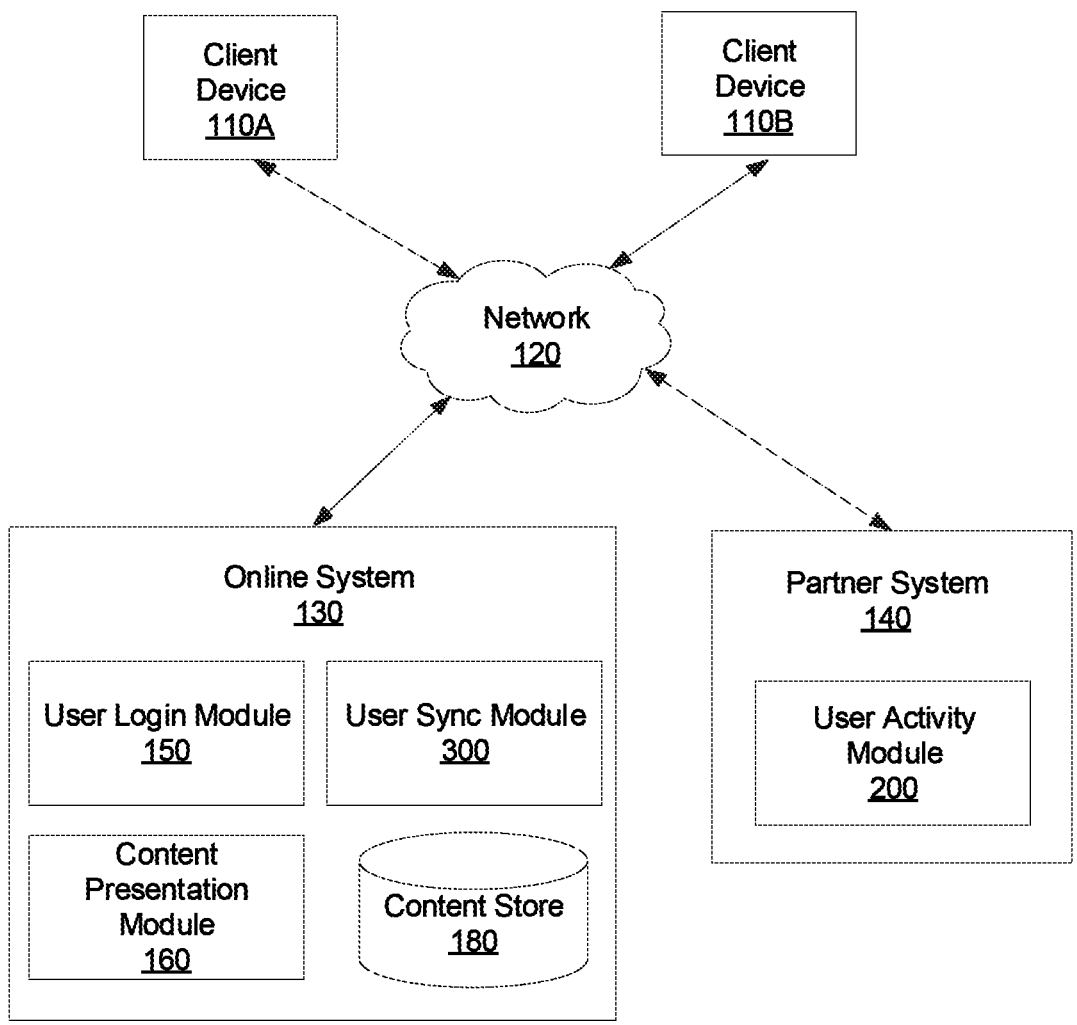
FIG. 1 illustrates a system environment for synchronizing user actions with users of an online system, in accordance with an embodiment.

FIG. 1 is a system environment including one or more client devices 110 connected through a network 120 to an online system 130. The online system 130 may include a user login module 150, a content presentation module 160, and a user sync module 300. Additionally, a partner system 140 may also be connected to the network 120 to communicate with the one or more client device 110 and the online system 130. The partner system 140 may also include a user activity module 200.

FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110b" in the figures).

A client device 110 is a computing device capable of transmitting and/or receiving data via the network 120. Examples of client devices 110 include desktop computers, laptop computers, tablet computers (pads), mobile phones, personal digital assistants (PDAs), gaming devices, or any other electronic device including computing functionality and data communication capabilities. A user may use a client device 110 to communicate with the online system 130 or the partner system 140 through the network 120. As an example, a user of the client device 110 can login to the online system 130 to access his/her user profile that is stored on the online system 130. In another example, the user can use the client device 110 to browse web pages hosted by the partner system 140. More specifically, the user may access the web page of a partner system 140 to browse products of interest and make an online purchase for a product.

The network 120 facilitates communications among one or more client devices 110, the online system 130, and the partner system 140. The network 120 may be any wired or wireless local area network (LAN) and/or wide area network (WAN), such as an intranet, an extranet, or the Internet. In various embodiments, the network 120 uses standard communication technologies and/or protocols. Examples of technologies used by the network 120 include Ethernet, 802.11, 3G, 4G, 802.16, or any other suitable communication technology. The network 120 may use wireless, wired, or a combination of wireless and wired communication technologies. Examples of protocols used by the network 120 include transmission control protocol/Internet protocol (TCP/IP), hypertext transport protocol (HTTP), simple mail transfer protocol (SMTP), file transfer protocol (TCP), or any other suitable communication protocol.

The partner system 140 represents any external system outside of the online system 130. For example, the partner system 140 may be a third party retailer that sells products of interest to users. The partner system 140 may provide web page interfaces to a client device 110 such that a user of the client device 110 may be able to browse through products of interest and make a purchase for a product offered by the partner system 140. In some embodiments, the partner system 140 may provide content items to the online system 130 to be presented to users of the online system 130. For example, the partner system 140 may want to notify users of the online system 130 of an upcoming sale. Thus, the partner system 140 provides a content item, such as an advertisement, to the online system 130 specifying users (e.g. targeting criteria) of the online system 130 that should be showed the content item. In doing so, the partner system 140 can increase the number of users that browse and purchase products of the partner system 140.

In various embodiments, the partner system 140 includes a user activity module 200 that handles the activity generated by a user on the web page of the partner system 140. For example, the user activity module 200 manages the activity of a user on a web page of the partner system 140 such as the purchases made by a user for one or more products of the partner system 140. As the user completes the purchase process, the user activity module 200 receives PII belonging to the user (e.g. name, shipping address, billing address, email, phone number, other contact information). In some cases, if the user has already logged onto the partner system 140, the partner system will have already associated the user with a user account and certain PII stored for the user. Additionally, the user activity module 200 may associate the PII of the user with a user-specific login identifier to the partner system 140 (e.g. a user's partner system ID).

In various embodiments, the user activity module 200 stores this information including the PII and/or the user's partner system ID. Additional information associated with the user may include the user's browsing history (e.g. user actions). More specifically, the user activity module 200 may store the information as a cookie on the user's browser. Therefore, if the user returns to the web page of the partner system 140 in the future, the partner system 140 can retrieve the user's partner system ID and PII of the user from the stored cookie such that a user purchase can proceed rapidly without having to reenter information.

The user activity module 200 is also responsible for communicating with the online system 130 such that the online system 130 can track conversions on the partner system 140. One way in which the online system 130 tracks conversions is via tracking pixels or pieces of code that the online system 130 provides for content providers (e.g., the partner system 140) to include on pages within their websites to monitor users visiting the websites that have not opted out of tracking. The tracking pixel is a segment of HTML code. A tracking pixel might be included on various pages, including on a product page describing a product, on a shopping cart page that the user visits upon putting something into a shopping cart, on a checkout page that the user visits to checkout and purchase a product, etc. For example, a tracking pixel is a transparent 1×1 image, an iframe, or other suitable object. When a user's browser loads a page having the tracking pixel, the tracking pixel results in the user's browser attempting to retrieve the content for that pixel. Specifically, the browser contacts the online system 130 through the user activity module 200 to retrieve the content. The request sent to the online system 130, however, actually includes various data about the user's actions taken on the third party website. The third party website can control what data is sent to the online system 130. For example, the third party system (e.g., the partner system 140) may include information about the page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In cases where the user is logged into the online system, a cookie set by the online system 130 can also be retrieved by the online system 130, which can include various data about the user, such as the online system's 130 UID for the user, information about the client device and the browser, such as the Internet Protocol (IP) address of the client device, among other data. Tracking can also be performed on mobile applications of content providers by using a software development kit (SDK) of the online system 130 or via an application programming interface (API) of the online system 130 to track events (e.g., purchases) that occur by users on the content provider's applications that are reported to the online system 130. In this manner, the online system 130 can track historical conversions by users on third party sites and match them to the online system user for tracking and use in training a prediction model regarding conversions.

The online system 130 includes a user login module 150, a content presentation module 160, and a user sync module 300. The user login module 150 may receive, from a client device 110, a user login request that includes the user's identifier (e.g. online system user ID) and a user password associated with the online system user ID. If the user provides a correct pairing of an online system user ID and password, the online system 130 provides content, such as a user profile, of the online system 130 to the client device 110. In some embodiments, the user login module 150 may store the online system user ID and password such that the user can easily login to the online system 130 without having to reenter his/her information in the future. For example, the online system user ID and password may be stored in a cookie on a browser accessed by the user to login to the online system 130.

The content presentation module 160 presents content items to users of the online system 130. The content item may be previously provided by a partner system 140 and stored in the content store 180. Additionally, the content item may be associated with targeting criteria that specify which users should be showed the content item. Therefore, the content presentation module 160 presents the content item to logged in users that satisfy the targeting criteria. After presenting the content item to users of the online system 130, the content presentation module 160 tracks whether users of the online system 130 view or interact with the content item. If so, the content presentation module 160 receives an indication that the user viewed the content item and may associate the indication with the user profile. The content presentation module 160 monitors the performance of the content item and can provide the performance statistics back to the partner system 140.

In various embodiments, the online system 130 also includes a user sync module 300 that is responsible for identifying users of the online system 130 that execute user actions that occur external to the online system 130. For example, the user sync module 300 receives, from the partner system 140, hashed PII, user actions performed by the user in association with the partner system 140, and identifiers (e.g. device identifier, browser identifier) associated with the user. Based on the hashed PII, the user sync module 300 identifies a user of the online system 130 that performed the action on a web page of the partner system 140. Identifying a user that executed a user action external to the online system 130 is useful for the online system 130 to enhance user experiences with the online system 130. For example, the online system 130 can expand the social graph (e.g. create new edges between nodes), update the performance of content items to reflect that a user performed a particular action in response to viewing the content item, or store a cookie in the browser that includes the online system user ID associated with the user such that future user actions taken by the user external to the online system 130 can be readily identified as having been performed by the user of the online system 130.

The online system 130 maintains a social graph made up of nodes and edges. The nodes represent objects in the online system 130 such as a user profile associated with a user of the online system 130. Additionally, a node may be represented by a profile page of a partner system 140. The online system 130 connects two nodes together using edges when there is an association between the two nodes. For example, a user of the online system 130 may purchase products from a partner system 140. The online system 130 receives this information through a stored cookie and creates an edge between the node representing the user and a node representing the partner system 140 to indicate that an association between the two nodes occurred.

User Actions Performed by a User on a Partner System

Figure 2:
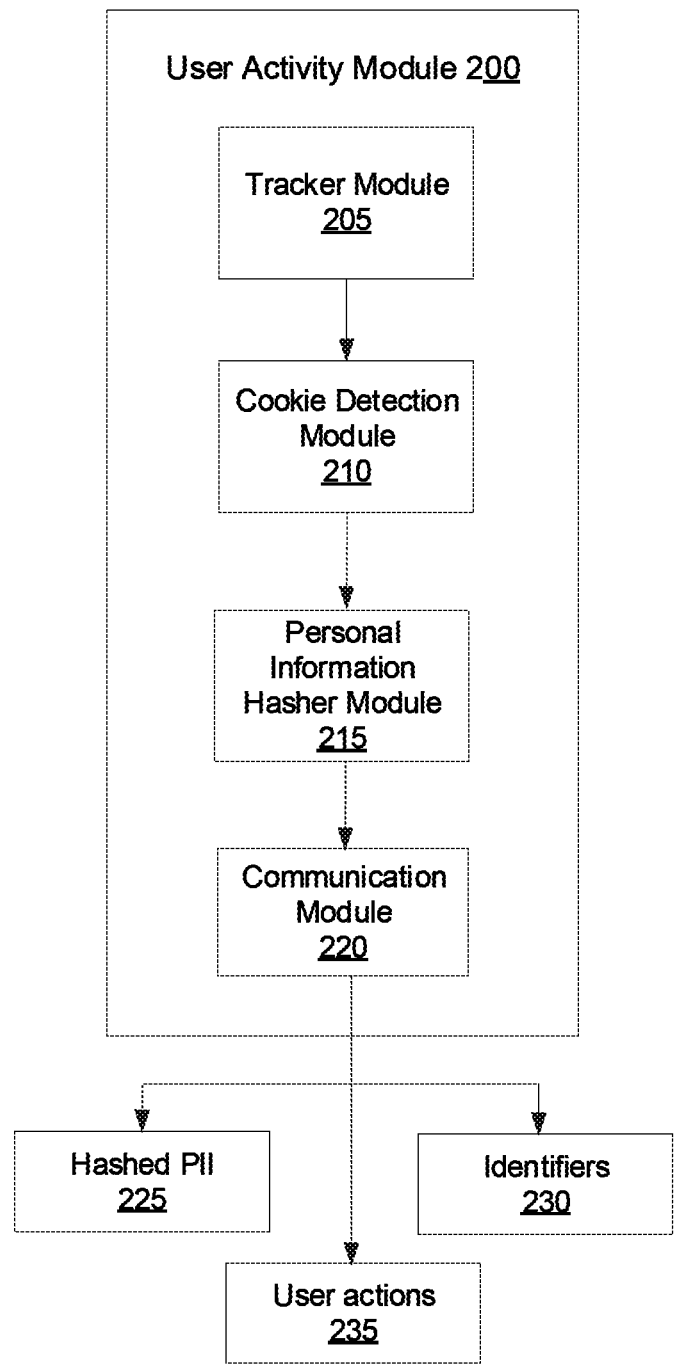
FIG. 2 illustrates a flow diagram for the user activity module of a partner system, in accordance with an embodiment.

FIG. 2 illustrates a flow diagram for the user activity module 200 of a partner system 140, in accordance with an embodiment. The user activity module 200 handles the activity of users that access a web page associated with the partner system 140 or access a mobile application of the partner system 140. The user activity module 200 includes a tracker module 205, a cookie detection module 210, a personal information hasher module 215 and a communication module 220.

The tracker module 205 tracks the user activity associated with a user on a webpage or mobile application of the partner system 140. As used hereafter, user activity includes, but is not limited to, navigating websites on the domain of a partner system 140, browsing products on the web pages, logging in with a login for the partner system 140, adding a product to a cart, or completing a purchase, and these activities can be on a website or mobile application of the partner system.

In some embodiments, the tracker module 205 also receives one or more identifiers associated with the user performing the user activity. For example, identifiers may identify the client device used by the user (e.g. device identifier), the browser used by the user (e.g. browser identifier), the mobile application, or a login identifier used by the user to login to the partner system 140 (e.g. user partner identifier). In some embodiments, the tracker module 205 also receives personally identifiable information (PII) belonging to the user. For example, a user may have provided his/her personal information when completing a purchase for a product and the information is provided to the online system via a pixel fire, via a mobile app event, or provided via a partner system cookie stored on the browser. The tracker module 205 gains access to this information and provides the received identifiers, user activity information, and PII to the cookie detection module 210.

The cookie detection module 210 locates a stored cookie of the online system 130 that identifies the user of the online system 130 that performed the user activity on the web page of the partner system 140. For example, in a scenario where the user previously logged into the online system 130 using a browser, the online system 130 may have created and stored a cookie in the browser that includes the user ID used to log into the online system 130 (e.g. online system user ID). Thus, the cookie detection module 210 retrieves the cookie and adds the received identifiers from the tracker module 205 (e.g. device identifier, browser identifier, user's partner system ID). Additionally, the cookie detection module 210 stores the browsing history of the user on the web pages of the partner system 140 into the cookie. The cookie is stored back on the browser.

In various embodiments, the user may not have logged into the online system 130 and therefore, the browser may not have a previously stored cookie that identifies the online system user ID of the user. For example, the user may be accessing the partner system 140 using a new device or browser that has not been previously used to access the online system 130. In other embodiments, the user may have recently cleared his/her stored browser cookies. In either scenario, the cookie detection module 210 would be unable to access a cookie in the browser. Therefore, the cookie detection module 210 creates a new cookie to be stored on the browser currently being accessed by the user. The new cookie may include the received identifiers from the tracker module 205 (e.g. device identifier, browser identifier, user partner identifier), the user's PII, and the browsing history of the user. In various embodiments, since the cookie detection module 210 was unable to detect a stored cookie with an online system user ID, the cookie detection module 210 provides the received PII of the user to the personal information hasher module 215.

The personal information hasher module 215 receives the user's PII and proceeds to encrypt or hash the information to protect the privacy of the user. In various embodiments, the personal information hasher module 215 only hashes the PII if the cookie detection module 210 was previously unable to detect a stored cookie that included a user ID identifying the user of the online system.

In various embodiments, the PII of a user may undergo preprocessing before application of a hashing algorithm. For example, the PII may be modified to include random data. As another example, the PII may undergo padding (e.g. bit padding or zero padding). In various embodiments, the PII is preprocessed such that the subsequent hashing of the PII is one-directional. In other words, the hashed PII cannot be processed to return the original PII.

The hashing methods performed by the personal information hasher module 215 may be keyed or unkeyed, cryptographic or non-cryptographic hash functions. For example, several unkeyed cryptographic hash functions include MD5 hash and the Secure Hash Algorithm (e.g. SHA-0, SHA-1, SHA-2, SHA-3). One skilled in the art may use a variety of methods to hash the PII. In various embodiments, the personal information hasher module 215 stores the hashed PII along with the received identifiers and user browsing activity in the cookie on the browser. Additionally, the personal information hasher module 215 may also include the specific preprocessing and hashing algorithms with the hashed PII in the cookie. Therefore, upon receipt of the hashed PII, the online system 130 can readily apply these algorithms.

The communication module 220 communicates with the online system 130. For example, a user can search for flights to Vienna, Austria on a web page domain hosted by the partner system 140. If the web page includes a tracking pixel, the tracking pixel causes the communication module 220 to send to the online system 130 certain information about the user, actions the user is or has taken on the web page (e.g., putting a product in a shopping cart, completing a checkout process, browsing a product page, etc.), price of product a user looked at or purchased, a SKU number for the product, a color, style, type or size of the product, a timestamp, a user identifier for the user that is used by the partner system 140, among other data. In addition, when the communication module 220 sends the tracked user information to the online system 130, the online system 130 can request for a stored cookie on the browser of the client device 110. Therefore, the communication module 220 provides the stored cookie associated with the user, from which the online system 130 can acquire information about the client device 110, browser of the client device 110, PII of the user, and other user associated information.

Syncing User Activity with a Logged Out User

Figure 3:
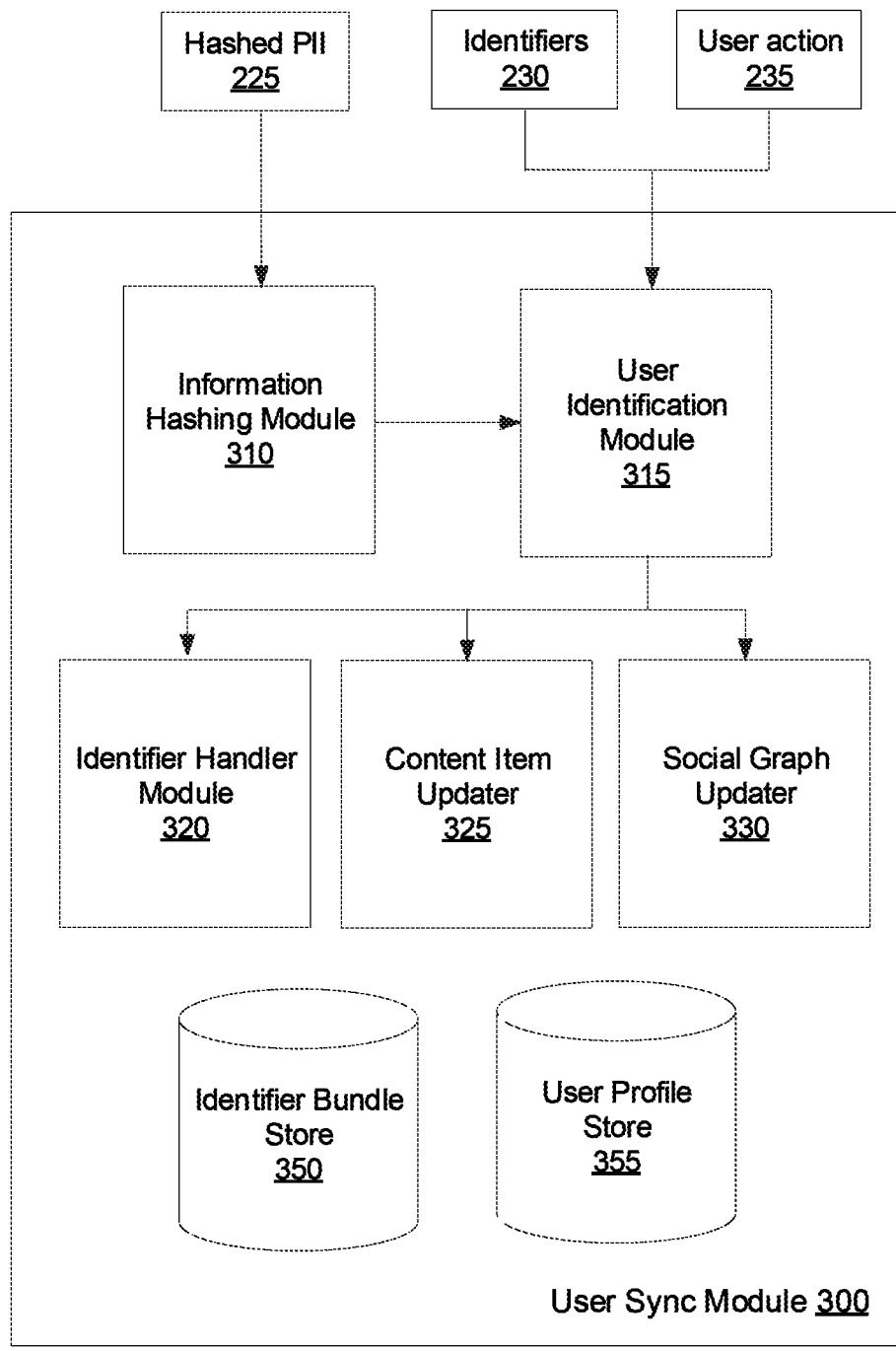
FIG. 3 illustrates a flow diagram of a user sync module of the online system, in accordance with an embodiment.

FIG. 3 illustrates a flow diagram of the user sync module 300 of the online system 130, in accordance with one embodiment. In various embodiments, the user sync module 300 receives information from the partner system 140 through a tracking pixel placed on the web page of the partner system 140 or via an app event from a mobile application of the partner system. In other embodiments, the user sync module 300 receives information from the partner system 140 in response to a request for a stored cookie. The information may be stored in a cookie on the browser and includes identifiers 230 associated with the user that performed the user action, the user action performed by the user on the partner system 140, and/or hashed PII 225 that may be used to identify the user. The user sync module 300 uses the identifiers 230 and/or the hashed PII 225 to sync user activity on a partner system 140 to a user profile that is associated with the user on the online system 130. In various embodiments, the user sync module 300 includes an information hashing module 310, a user identification module 315, an identifier handler module 320, a content item updater 325, and a social graph updater 330.

When the user sync module 300 receives the identifiers 230, the user identification module 315 may first check whether an online system user ID is included in the identifiers 230. If so, the user identification module 315 may match the online system user ID to a user profile associated with a user of the online system 130 and proceed to the identifier handler module 320, the content item updater 325, and the social graph updater 330. However, in many scenarios where the user may not have previously logged into the online system 130, the identifiers 230 received by the user sync module 300 do not include an online system user ID.

The information hashing module 310 receives the hashed PII 225 from the partner system 140. Additionally, the hashed PII 225 may have associated information that describes the algorithms that were used to preprocess and/or hash the hashed PII 225. Therefore, the information hashing module 310 retrieves personal information from user profiles that are stored in the user profile store 355. The information hashing module 310 hashes the personal information according to the preprocessing and/or hashing algorithms used to generate the hashed PII 225. In some embodiments, the information hashing module 310 may receive the preprocessing and hashing algorithms at an earlier time instance and may hash personal information from user profiles prior to receiving the hashed PII 225. In various embodiments, the hashed PII 225 received from the partner system 140 and the hashed personal information generated by the information hashing module 310 are provided to the user identification module 315 to identify a user of the online system 130.

In various embodiments, the received hashed PII 225 may have undergone an encryption process instead of hashing. Therefore, the information hashing module 310 may receive associated information that provides instructions as to how to de-encrypt the PII. Thus, the information hashing module 310 de-encrypts the received PII and provides the de-encrypted PII to the user identification module 315 to identify a user of the online system 130.

The user identification module 315 identifies a user of the online system 130 that performed the user action 235 on a web page of the partner system 140 based on the hashed PII 225. For example, the user identification module 315 may receive a hashed email address that originated from the partner system 140 and a hashed email address generated by the information hashing module 310 and compares the two to determine whether there is a match. Each hashed email address may be a fixed-length, e.g., 128 bits. Therefore, the user identification module 315 applies an individual bit by bit comparison between the two hashed email addresses. In various embodiments, if one or more bits differ between the two hashed emailed addresses, the user identification module 315 deems the comparison a non-match. When every bit between the two hashed email addresses is determined to be a match, then the comparison is deemed a match. The user identification module 315 may apply this comparison for any type of hashed PII including, but not limited to, the user's first name, user's last name, phone number, address (billing or shipping), business address, and business name. Thus, the user identification module 315 identifies a user of the online system 130 based on this comparison.

In various embodiments, the user identification module 315 generates a confidence score (e.g. between 0-100) that reflects a strength of certainty that the identified user of the online system 130 is truly the individual that performed the user action 235 on a web page of the partner system 140. The confidence score is dependent on the comparison between the hashed PII and the hashed personal information from a user profile. For example, the received hashed PII from the partner system 140 may only include a user's hashed email address. The user identification module 315 may compare the user's hashed email address but detect that more than one bit differs. Therefore, the user identification module 315 may assign a score of 0 to the comparison between the hashed email address from the partner system 140 and the hashed email address of the user. Alternatively, if the user identification module 315 successfully identifies a matching hashed email address in a user profile, then the user identification module 315 may assign a score of 75 (out of 100), indicating a high likelihood that the user associated with that user profile likely performed the user action 235 on the web page of the partner system 140.

In various embodiments, the generated confidence score may depend on the specificity of the hashed PII that was found to be a match. For example, email addresses are likely highly specific to users of the online system 130 whereas popular names (e.g. John Smith) may be much less specific. Therefore, a hashed email address that only matches a single user profile may be assigned a relatively high confidence score of 75. However, a hashed user first/last name that matches a large number of user profiles may be assigned a lower confidence score given the level of uncertainty.

In various embodiments, the generated confidence score may further depend on the type of hashed PII that was found to be match. For example, an email address is likely to be specific to a single person whereas a physical address may be less specific as a family (e.g. multiple people) resides at the physical address. Therefore, as previously stated, the user identification module 315 may assign a high confidence score of 75 when a hashed email address matches a single user profile. The user identification module 315 may assign a slightly lower confidence score (e.g. 60) when a hashed physical address matches a single user profile.

The user identification module 315 may increase the generated confidence score as the user identification module 315 identifies additional matches between the hashed PII and different personal information on the user profile. For example, if a single user profile includes personal information that, when hashed, matches the received hashed PII from the partner system 140 including a hashed first/last name, a hashed email address, hashed phone number, and a hashed physical address, then the user identification module 315 may assign a confidence score of 95 of even a maximum confidence score of 100 to indicate that the user profile very likely belongs to the user that performed the user action 235 on a web page of the partner system 140.

In various embodiments, the user identification module 315 may lower the generated confidence score if the contradictory matches between the received hashed PII and different user profiles occur. For example, as previously stated, a match of a single user profile with a hashed email address may yield a confidence score of 75. However, the hashed PII may also include a hashed name that does not match with the name listed in the user profile. The user identification module 315 may lower the confidence score to reflect the increased level of uncertainty between the received hashed PII and the identified user profile.

The user identification module 315 compares the confidence score to a threshold value to conclusively determine whether the user profile belongs to the user that performed the user action 235 on the web page of the partner system 140. In one embodiment, if the confidence score is equal to or above the threshold score, then the user identification module 315 associates the user action 235 with the user profile. If the confidence score is below the threshold score, the user identification module 315 fails to find a matching user profile and does not associate the user action 235 with a user profile.

When a matching user profile is identified, the user identification module 315 sends the identifiers 230 associated with a user to the identifier handler module 320. The identifiers 230 include any identifiers (e.g. device identifier, browser identifier) that are associated with the user that performed the user action. In various embodiments, each of the identifiers 230 is new and has not been previously received by the online system 130. In various embodiments, the online system 130 maintains a bundle of identifiers (e.g. a federated list of identifiers) in the identifier bundle store 350 that are associated with the user profile of a user of the online system 130. Each bundle of identifiers includes an online system user identifier that identifies the user of the online system 130.

The bundle of identifiers includes all identifiers that have previously been received by the online system 130 that are deemed to be associated with the user of the online system 130. For example, if the user had previously used a client device 110 to login to the online system 130, the device identifier that identifies the client device 110 would be stored by the online system 130 in the bundle of identifiers associated with the user profile. The identifier handling module 320 evaluates each identifier of the identifiers 230 determine whether the matched user profile already has the identifier in its associated bundle of identifiers. If the identifier is not included in the bundle of identifiers associated with the user profile, the identifier handling module 320 updates the bundle of identifiers to include the new identifier.

In various embodiments, with a matching user profile identified, the identifier handler module 320 creates and stores cookies on the browser of the user. For example, the identifier handler module 320 receives the identifiers 230 and further retrieves the online system user ID associated with the matching user profile. The identifier handler module 320 creates a cookie that includes the identifiers 230 and the online system user ID and stores the cookie on the browser used by the user. Thus, if the user continues to perform user actions using the browser with the stored cookie (e.g. the user continues to visit other partner systems 140), the user's activity can be rapidly synced to the matching user of the online system 130 because of the presence of the online system user ID in the stored cookie. This is achieved even if the user never logs into the online system 130 using the browser.

In various embodiments, the user sync module 300 also includes a content item updater 325 for updating the performance statistics of a content item. The content item updater 325 checks whether the matching user profile possesses an indication that the user viewed a relevant content item that may have caused the user to perform the user action 230 on the web page of a partner system 140. For example, if the user action 230 was a purchase of a product, the content item updater 325 determines whether the user was previously presented a relevant content item by the content presentation module 160 (see FIG. 1) and whether the user viewed the content item that was related to the purchased product. If so, the content item updater 325 may conclude that the user's action of purchasing a product was likely a result of having viewed the content item. Therefore, the content item updater 325 updates the statistics associated with the performance of the content item (e.g. click through rate, cost per click, conversion rate) given that this newly discovered user activity was a result of the content item. The online system 130 may provide the updated performance of the content item back to the partner system 140 for further analysis.

The social graph updater 330 expands the social graph to reflect the received user actions 235 that occurred external to the online system 130. For example, the received user actions 235 may include the user's browsing activity into multiple partner systems 140 that the user navigates to. Therefore, the social graph updater 330 identifies the nodes in the social graph that each represent a partner system 140 that the user has visited. Additionally, the social graph updater 330 identifies the node that represents the user profile belonging to the matched user. The social graph updater 330 creates edges between the user profile node and each of the partner system 140 nodes to indicate the association between the user and each of the partner systems 140. Thus, by expanding the social graph with user actions 235 that occur external to the online system 130, the online system 130 can more comprehensively understand the behavior of its users which may be used for more accurate targeting of content items.

Process of Syncing User Activity by a Partner System

Figure 4:
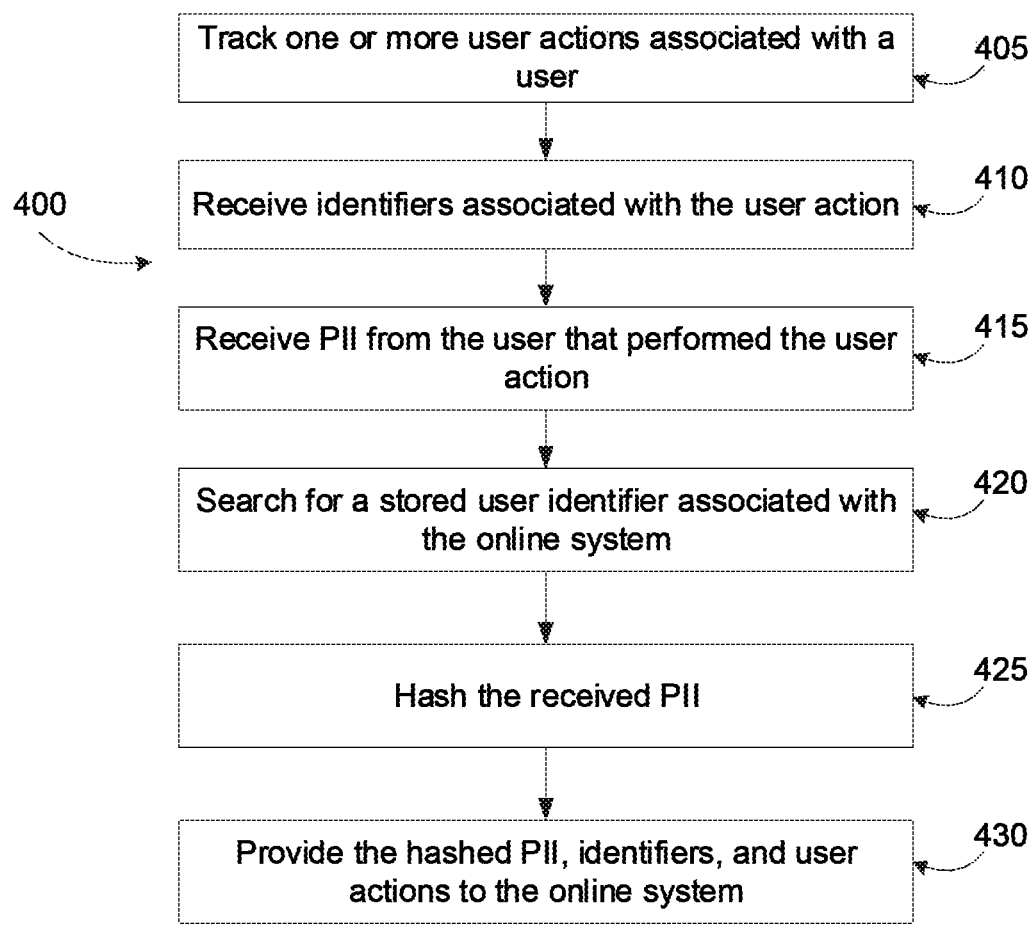
FIG. 4 illustrates a flow chart of providing hashed personally identifiable information and one or more identifiers by a partner system, in accordance with an embodiment.

FIG. 4 is a flow diagram of a process performed by the partner system 140 for syncing user activity performed on a partner system 140 to a user of the online system 130, in accordance with an embodiment. The partner system 140 tracks 405 user actions associated with a user. For example, if a user navigates to a web page of the partner system 140, the partner system 140 tracks the navigation performed by the user. In another example, if a user adds a product to a purchase cart and purchases the product, the partner system 140 tracks that the user added a product to the shopping cart and completed the purchase action. In various embodiments, the tracking can be accomplished by the partner system 140 by employing a pixel fire or other techniques that are well understood in the online tracking field. The partner system receives 410 identifiers associated with the user action. For example, this may include one or more of a device identifier, browser identifier, or user partner identifier.

In some embodiments, the browser and/or device identifier are new and were not previously associated with the user. The partner system 140 receives 415 PII from the user that performed the user action. This may be information such as the user's name, address, email address, phone number that the user provides to the partner system 140 while completing the purchase. The partner system 140 searches 420 the browser for a stored cookie that identifies the user of the online system 130. For example, if the user previously logged into the online system 130, a cookie may have been previously stored on the browser that includes the user ID used to login to the online system 130. In some embodiments, the stored cookie does not exist, meaning that the user has not previously logged into the online system 130 using that browser or device. The partner system hashes 425 the received PII. In various embodiments, the partner system 140 stores the hashed PII, identifiers, and tracked actions in a cookie of the browser used by the user. Therefore, when the online system 130 requests for the stored cookie in response to a server call, the partner system 140 provides 430 the stored cookie, enabling the online system 130 to gain access to user's hashed PII, identifiers associated with the user, and user activities.

Process of Syncing User Activity by an Online System

Figure 5:
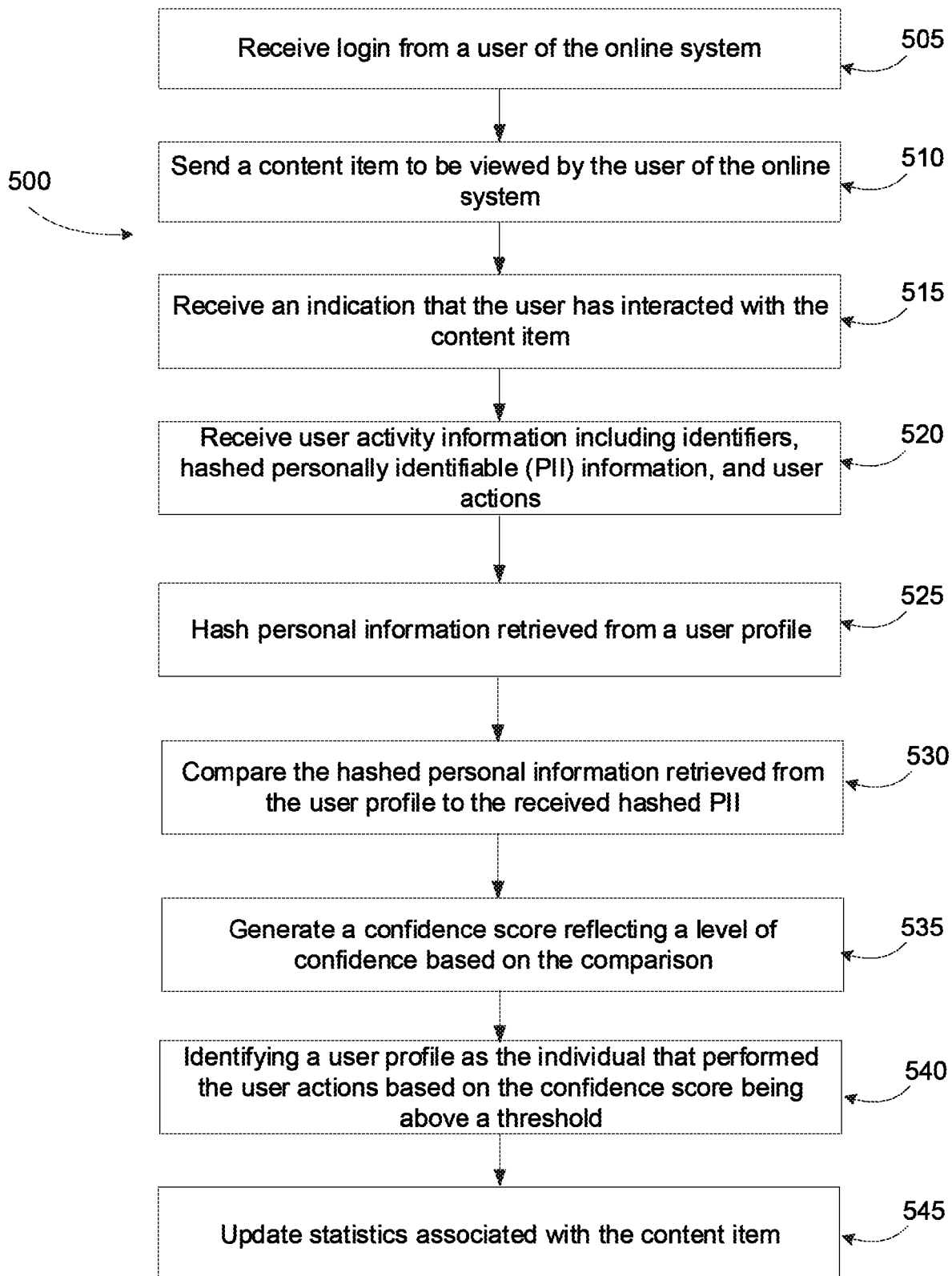
FIG. 5 illustrates a flowchart of syncing user activity with logged out users, in accordance with one embodiment.

FIG. 5 is a flow diagram of syncing user activity performed on a partner system 140 to a user of the online system 130, in accordance with an embodiment. The online system 130 receives 505 a login from a user of the online system and sends 510 a content item (e.g. an advertisement) to be viewed by the user on a client device 110. In some embodiments, the user views the content item on a web browser that the user used to login to the online system 130. The online system 130 receives 515 an indication that the user of the online system has interacted with the content item.

The online system 130 receives 520 information about user activity that was performed on a web page of a partner system 140. The user activity may be obtained from a server call or from a request by the online system 130 for a stored cookie from the partner system 140. The user activity includes hashed PII regarding a user that performed the user activity on the web page of the partner system 140. In some embodiments, the online system 130 receives the information from a stored cookie and the information about user activity is a purchase of a product by a user on the partner system 140. The online system 130 hashes 525 personal information from user profiles on the online system 130 to compare 530 whether the personal information matches the received hashed PII. For each comparison, the online system 130 generates 535 a confidence score reflecting a level of confidence of the match. The user of the user profile is identified 540 to be the user that performed the user activity on the web page of the partner system 140 if the confidence score is above a threshold confidence score. In various embodiments, the online system 130 uses the information of the match to updates 545 statistics (e.g. advertising campaign statistics) associated with the content item to more accurately reflect that the content item caused the user to perform the user activity.

GENERAL

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by an online system, user activity information from a browser used by an individual whose identity is not currently available to the online system, the user activity information comprising personally identifiable information of the individual from a partner system;
retrieving personal information of a user of the online system from a user profile selected based on the received personally identifiable information;
generating a confidence score indicating a likelihood that the user described by the personal information matches the individual described by the personally identifiable information based on actions taken by the individual on a content item external to the online system;
identifying the user profile as belonging to the individual based on the confidence score; and
responsive to identifying the user profile as belonging to the individual, updating statistics associated with the content item to reflect the actions taken by the individual on the content item external to the online system.

2. The method of claim 1 further comprising:
prior to receiving the user activity information,
receiving, by the online system, a login request from a user of the online system, the login request comprising an online system user identifier;
sending a content item to be viewed by the user of an online system; and
receiving an indication that the user has viewed the content item.

3. The method of claim 1 further comprising:
after identifying the user profile of the individual,
retrieving an online system user identifier associated with the user profile;
storing a cookie on the browser used by the individual to generate the user activity information, the cookie including the online system user identifier such that the cookie allows the individual to be identified by the online system during future actions by the individual external to the online system.

4. The method of claim 1, wherein the personally identifiable information is hashed personally identifiable information including at least one of the individual's first name, last name, phone number, email address, or date of birth.

5. The method of claim 1, wherein the generated confidence score is dependent on a specificity of hashed personally identifiable information.

6. The method of claim 1, wherein the generated confidence score is dependent on a type of personally identifiable information that is matched by the personal information from the user profile.

7. The method of claim 1, wherein identifying the user profile as belonging to the individual based on the generated confidence score further comprises:
comparing the generated confidence score to a threshold score.

8. The method of claim 1, wherein the user activity information is captured through a tracking pixel on a web page of the partner system on which the user performed user actions that causes the browser to send the user activity information to the online system.

9. The method of claim 1, further comprising:
responsive to receiving hashed personally identifiable information from the browser:
receiving, with the hashed personally identifiable information, associated information that describes hashing algorithms used to hash the personally identifiable information; and
hashing the personal information retrieved from the user profile on the online system using the hashing algorithms.

10. The method of claim 1 further comprising:
storing, by the online system, an association between a node in a social graph representing the user profile and a node in the social graph that represents the partner system associated with the actions performed on the content item by the individual external to the online system.

11. The method of claim 1, wherein the user activity information further comprises one or more identifiers associated with the individual that performed the actions on the content item external to the online system.

12. The method of claim 11, wherein the one or more identifiers comprise at least one of a device identifier, a browser identifier, and a user partner identifier, wherein each of the one or more identifiers is newly received by the online system.

13. A non-transitory computer-readable medium comprising computer program instructions, the computer program instructions when executed by a processor of a computer device causes the processor to perform steps including:
receiving, by an online system, user activity information from a browser used by an individual whose identity is not currently available to the online system, the user activity information comprising personally identifiable information of the individual from a partner system;
retrieving personal information of the user of the online system from a user profile selected based on the received personally identifiable information;
generating a confidence score indicating a likelihood that the user described by the personal information matches the individual described by the personally identifiable information based on actions taken by the individual on a content item external to the online system;
identifying the user profile as belonging to the individual based on the confidence score; and
responsive to identifying the user profile as belonging to the individual, updating statistics associated with the content item to reflect the actions taken by the individual on the content item external to the online system.

14. The transitory computer-readable storage medium of claim 13 further comprising computer instructions that, when executed by a processor of a computer device, causes the processor to perform the steps including:
prior to receiving the user activity information,
receiving, by the online system, a login request from a user of the online system, the login request comprising an online system user identifier;
sending a content item to be viewed by the user of an online system; and
receiving an indication that the user has viewed the sent content item.

15. The non-transitory computer-readable storage medium of claim 13 further comprising computer instructions that, when executed by a processor of a computer device, causes the processor to perform the steps including:
after identifying the user profile of the individual,
retrieving an online system user identifier associated with the user profile;
storing a cookie on the browser used by the individual to generate the user activity information, the cookie including the online system user identifier such that the cookie allows the individual to be identified by the online system during future actions by the individual external to the online system.

16. The non-transitory computer-readable storage medium of claim 13 further comprising computer instructions that, when executed by a processor of a computer device, causes the processor to perform the steps including:
storing, by the online system, an association between a node in a social graph representing the user profile and a node in the social graph that represents the partner system associated with the actions performed on the content item by the individual external to the online system.

17. The non-transitory computer-readable storage medium of claim 13, wherein the personally identifiable information is hashed personally identifiable information including at least one of the individual's first name, last name, phone number, email address, or date of birth.

18. The non-transitory computer-readable storage medium of claim 13, wherein identifying the user profile as belonging to the individual based on the generated confidence score further comprises:
comparing the generated confidence score to a threshold score.

19. The non-transitory computer-readable storage medium of claim 13, wherein the personally identifiable information is hashed personally identifiable information including at least one of the individual's first name, last name, phone number, email address, or date of birth.

20. The non-transitory computer-readable storage medium of claim 19, wherein the one or more identifiers comprise at least one of a device identifier, a browser identifier, and a user partner identifier, wherein each of the one or more identifiers is newly received by the online system.

* * * * *